July 11, 1961 W. F. HARBISON ET AL 2,991,816
FASTENER MEANS WITH NUT MEMBER HAVING PILOT
PORTION FOR ALIGNING HOLES IN PANELS
Filed Oct. 3, 1958

INVENTORS
WALLACE F. HARBISON
DARRIL D. MILLER
BY
*Walter J. Jaton*
ATTORNEY

United States Patent Office 2,991,816
Patented July 11, 1961

2,991,816
FASTENER MEANS WITH NUT MEMBER HAVING PILOT PORTION FOR ALIGNING HOLES IN PANELS
Wallace F. Harbison, Fort Worth, Tex., and Darril D. Miller, Santa Ana, Calif., assignors to General Dynamics Corporation, San Diego, Calif., a corporation of Delaware
Filed Oct. 3, 1958, Ser. No. 765,251
9 Claims. (Cl. 151—41.7)

This invention relates to quick action fasteners and more particularly to a retained quick acting fastener for stressed access panels for aircraft or the like.

In the design of supersonic aircraft the most efficient structural design calls for the outer cover or skin to provide part of the structural strength. Numerous access panels are strategically located on the airplane through which access may be had to the electronics, hydraulics, controls, fueling, air conditioning and other equipment housed within. To accomplish the structural efficiency required, these access panels must also carry their part of the load. Therefore, when a panel is removed the understructure is stressed more than normally and a small amount of deflection of the understructure occurs. The hole pattern in the understructure moves along also, causing a shifting of the hole pattern with respect to the removed access panel. This shifting occurs gradually as the fasteners are removed so that the last of the fasteners in a panel to be removed are the ones most affected by residual shear, making their removal the most difficult. The panel also deflects with the loading removed to make the foregoing condition even more severe. In replacing the panel, the fastener must have sufficient strength to pull the warped or deflected panel and understructure tightly together and must have a large tolerance to enable it to pull the misaligned openings into place.

The quick action fastener comprising the present invention consists of a stud nut releasably mounted by a retainer to the inner surface of an understructure member under an opening into which a sleeve bolt is to be inserted. The sleeve bolt passes through a mating opening in the panel and is retained therein by a retaining spring. The sleeve bolt head is countersunk into the panel. A circular groove is made in the head for controlled head shear off so that the head will shear before any other part of the fastener fails when over-torquing occurs. A small indentation is made in the side of the bolt and the thin wall and threads are deformed inwardly to form a locking device. The sleeve bolt threads are protected from stripping against the openings and a double step with interconnecting tapering shoulder is provided on the outer wall to permit mating of the male and female threads when the openings are misaligned. As the sleeve bolt is being tightened into the floating stud nut, the tapered shoulder of the sleeve bolt passes through and aligns the two openings. Torquing the sleeve bolt to the proper torque value pulls the panel and understructure together and locks them thus in fixed relationship. Removal of the sleeve bolt is affected by simply unscrewing the sleeve bolt. If residual shear is present the sleeve bolt will jack its way out. When the sleeve bolt is free from the stud nut it will be retained in the access panel.

It is therefore an object of this invention to provide for a quick action fastener which is self locking in an infinite number of positions.

Another object is the provision of a quick action fastener having a floating stud nut mounted behind an opening in an understructure for engaging a sleeve bolt inserted into a misaligned panel opening.

Another object is the provision of a quick action fastener for aligning mating openings in a panel and understructure to apply the proper loading thereon.

Another object is the provision of a quick action fastener wherein the sleeve bolt portion is retained in the access panel after its removal from the stud nut portion which is retained by the understructure.

Another object is the provision of a fastener having a controlled shearing of a sleeve bolt head when the fastener becomes over torqued.

Another object is the provision of a fastener wherein the sleeve bolt and stud nut portions may be replaced without replacement of securing rivets.

Other objects and features of the present invention will be readily apparent to those skilled in the art from the following specification and appended drawings wherein is illustrated a preferred form of the invention, and in which.

Figure 1:
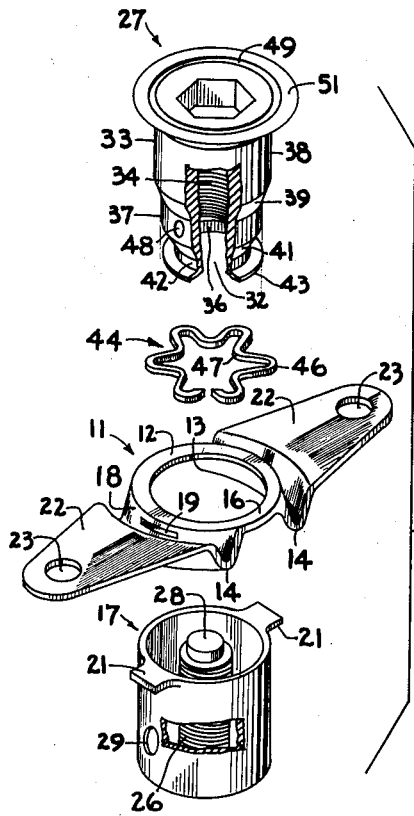
FIGURE 1 is an exploded view of the preferred embodiment.

Referring now to FIGURE 1 there is shown a stud nut retainer 11 comprising a single piece of sheet metal having a flat annular central portion 12 provided with a bolt opening 13 therethrough. On opposite sides of the central portion 12 of the retainer, the sheet metal is deformed downwardly into ribs 14 of substantially U-shaped cross section, the ribs being radially curved about the center of the opening on a common radius. The lateral width of the retainer 11 is less than the diameter of the circle defined by the ribs 14 so that part 16 of the central portion 12, which interconnects the ribs 14, is not stiffened by the ribs. This part 16 then may be flexed downwardly for installation and removal of stud nut 17 in a manner hereinafter to be described. The inner wall 18 of the ribs 14 is provided at its center with a lug opening 19 for receiving the lugs 21 on the stud nut 17. Integral with the ribs 14 and extending outwardly therefrom are tabs 22 having fastener holes 23 therein to serve as a mounting means for mounting the retainer 11 to a support. After forming, the retainer 11 is heat treated to spring temper to render it resilient so that it may be flexed without permanent deformation; the ribs 14 being capable of being outwardly flexed to increase the spacing between the lug openings 19. Normally, the spacing between the lug openings 19 is less than the spacing between the outer ends of the lugs 21 on the stud nut 17 to prevent disengagement of the nut 17 from the retainer 11. The lugs 21 on stud nut 17 have substantially parallel sides to permit lateral movement. The openings 19 are wider than the lugs to permit transverse movement. Hence the stud nut 17 is free to float in any direction in a plane defined by the openings 19.

Stud nut 17 consists of a cylindrical barrel 24 with lugs 21 extending outwardly from the top to provide floating movement as previously described. A threaded stud 26 of diameter smaller than the diameter of the inner surface of the barrel 24 is nonrotatably secured to the bottom of the barrel. The space between the stud 26 and the barrel 24 is for receiving the sleeve bolt 27 as will later become more apparent. The top portion 28 of stud 26 is not threaded in order to preclude any cross-threading. Barrel 24 has suitable holes 29 drilled therein to drain any fluids that may have accumulated therein.

The sleeve bolt 27 may be formed from a countersunk bolt blank with an internally engageable head 31. The type shown is Allen wrench actuated although other types of actuations are also suitable. A hole 32 is drilled along the axis of the shank 33 and tapped with multi-lead threads 34. The outer portion of the shank 33 is stepped to provide for an outer lower surface 37 of smaller diameter than the upper portion 38. A tapered shoulder 39 interconnects the two surfaces. A second tapered shoulder 41 extends from the smaller surface 37 to form a recessed portion 42 adjacent the end flange 43. The flange 43 has an outer diameter substantially equal to the diameter of portion 37. A "Star of David" type spring 44 having inwardly and outwardly curved resilient portions 46, 47 is adapted for radial expansion. It is adapted to seat around the recessed portion 42 and to slide upwardly over the tapered shoulders 41 and 39 to retain itself around the upper shank portion 38 of larger diameter.

A small indentation 48 is made in lower surface 37 and the thin wall and inner threads adjacent thereto are deformed inwardly to form a locking device by engagement with the male threads of stud 26.

An annular groove 49, which has a bottom diameter substantially equal to the diameter of the upper portion 38, is formed in the head 31 of sleeve bolt 27 to provide for controlled shear-off of the flanged portion 51 of the head 31 before any other part of the fastener fails, as will hereinafter be more fully described. This feature provides for easy repair of over-torqued fasteners by simply unscrewing the sleeve bolt 27 and replacing it with another.

Figure 2:
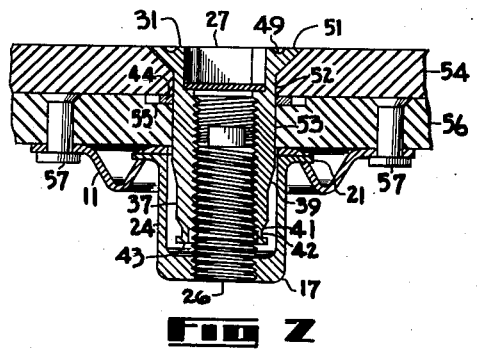
FIGURE 2 is a sectional view of the fastener retaining a panel in position.

The use of the quick action fastener is best shown with reference to the sectional view in FIGURE 2. Here matched holes 52, 53 are drilled through access panel 54 and understructure 56. Hole 52 in the panel is countersunk to receive sleeve bolt head 31 and hole 53 in the understructure is counterbored at 55 to receive the retention spring 44. Stud nut 17 is then aligned with hole 53 in the understructure 56 and its retainer 11 is installed on the inner surface of the understructure with flush rivets 57. Sleeve bolts 27 are then inserted through the holes 52 in the access panel 54 and retaining rings 44 snapped into place to retain the sleeve bolts in the access panel holes. The panel is then ready to install. The lengths of the stud 26 in stud nut 17 and sleeve bolt 27 are such that stud top 28 receives outer unthreaded end 36, and the sleeve bolt engages several threads of the floating stud nut, before the tapered shoulder 39 of the sleeve bolt prys itself through the misaligned understructure hole 53, pulling the panel and understructure into alignment and together.

Controlled shear-off of the flanged portion 51 due to the provision of groove 49 in the head 31 can best be understood by referring to FIGURE 2. It is apparent that tightening of the sleeve bolt 27 on the stud nut 17 more than necessary to pull the panel and understructure together would tend to draw the head 31 of the sleeve bolt through the hole 52 to produce inward bending of the flanged portion 51 into the space occupied by the Allen wrench as it works its way through the hole 52 in panel 54. However, since the Allen wrench does occupy this space, the inward bending of the flange 51 is restrained upon contact with the wrench, and continued movement of the flanged portion 51 through the hole 52 instead produces a shear of the flange in a plane parallel to the sleeve bolt axis and coextensive with the peripheral diameter of the bolt shank. By providing the groove 49 in the head 31 the length of material in the shear plane is reduced, thereby lessening the force required to shear off the flanged portion 51, and establishing control thereover.

Although the distance of a plane at right angles to the conical undersurface of the flanged portion 51 to the groove 49 is somewhat less than the distance of the plane from the shank portion 38 to the groove, as shown in FIGURE 2, shear will not develop along the plane, since the material within this plane is in continuous compression as the head 31 works itself downward against the panel 54.

Figure 3:
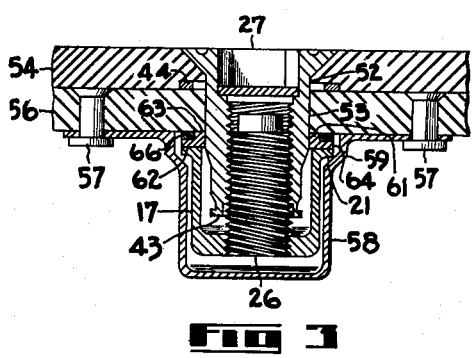
FIGURE 3 is a sectional view of a modification for use in fastening a panel in fluid tight relationship over an understructure.

FIGURE 3 shows a modification for use in fastening the panel 54 in fluid tight relationship with the understructure 56. The panel and understructure may be engaged in fluid tight relationship in a conventional manner, not shown. In sealing the fastener engaging holes 52, 53 however, a modification of the stud nut retainer 11 is shown here as retainer 58. This retainer is dome shaped with spaced outwardly flared portions 59 at the top suitably sized to permit lugs 21 to float therein. Pressed portions (not shown) of the walls of retainer 58 project into the path of lugs 21 to prevent rotation of stud nut 17. This retainer 58 adjacent its upper end is also provided with oppositely spaced internal shoulders (not shown) upon which an annular sealing ring 61 is seated. This sealing ring 61 has an inner, upstanding cylindrical wall 63 about its inner periphery and a radially extending collar 64 which rests upon the internal shoulders of retainer 58. A resilient O-ring 66 is positioned outwardly of wall 63 and upon collar 64 such that when the retainer 58 is secured in place as by rivets 57, the O-ring 66 effects a continuous, tight seal about the hole 53 in understructure 56. Opening 52 in panel 54 is counterbored to receive sleeve bolt retension spring 44 as an alternate, if desired. The stud nut 17 and sleeve bolt 27 are the same as shown in FIGURES 1 and 2.

Although the embodiments in FIGURE 2 and FIGURE 3 show the stud 26 threadedly secured in the bottom of the barrel portion 24 of stud nut 17, it is to be understood that there are several obvious methods of non-rotatably securing the stud in position, such as by welding, pressing, crimping, etc., or by integrating elements 26 and 24.

Figure 4:
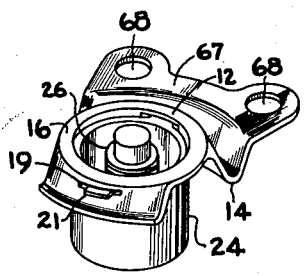
FIGURE 4 is a perspective of a modification for corner fastening.

FIGURE 4 shows a modification of the retainer suitable for corner mounting. Here tab 67 has a pair of fastener holes 68 and there is no tab extending from the rib 14 on the other side. The lug openings 19 may be spaced apart to insert the lugs 21 by the outward extension of ribs 14 in the same manner as explained in reference to FIGURE 1.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A quick action fastener for joining a panel to an understructure comprising a stud nut having an externally threaded stud, means for attaching said stud nut to position one end of said stud behind a hole in said understructure in planar floating relationship, said stud nut extending substantially to the undersurface of said understructure, a sleeve bolt comprising a head, and shank, said shank being internally threaded along its axis from the outer end thereof, said shank having a portion of larger diameter nearer said head adapted for insertion through a hole in said panel, a portion of smaller diameter nearer said outer end having a length greater than the thickness of said understructure and adapted for insertion through said understructure hole which may be slightly misaligned with said panel hole for threadedly engaging said one end of said stud, and a portion interconnecting said larger and smaller diameter portions for engaging said understructure to align said holes when said panel and said understructure are drawn together by tightening said sleeve bolt over said stud.

2. A quick action fastener for joining a panel to an understructure comprising a stud nut having an externally threaded stud, means for attaching said stud nut to position one end of said stud behind a hole in said understructure in planar floating relationship, said stud nut extending substantially to the undersurface of said understructure, an internally threaded sleeve bolt comprising a head, and shank, said shank having a portion of larger diameter nearer said head adapted for insertion through a hole in said panel, an end portion of smaller diameter having a length greater than the thickness of said understructure and adapted for insertion though said understructure hole which may be slightly misaligned with said panel hole for threadedly engaging said threaded end of said stud, and a tapered shoulder interconnecting said portions for engaging said understructure to align said holes when said panel and said understructure are drawn together by tightening said sleeve bolt over said stud.

3. A quick action fastener as set forth in claim 2, said shank further having an indentation in said portion of smaller diameter for providing a thin wall portion inwardly deformed to present frictional engagement with said stud inserted therein.

4. A quick action fastener for joining a panel to an understructure comprising a stud nut having an externally threaded stud, means for attaching said stud nut to position one end of said stud behind a hole in said understructure in planar floating relationship, said stud extending substantially to the undersurface of said understructure, an internally threaded sleeve bolt comprising a head, and a shank, said shank having a portion of larger diameter nearer said head adapted for insertion through a hole in said panel, a portion of smaller diameter having a length greater than the thickness of said understructure and adapted for insertion through said understructure hole which may be slightly misaligned with said panel hole for threadedly enaging said one end of said stud, a tapered shoulder interconnecting said portions for engaging said understructure to align said holes when said panel and said understructure are drawn together by tightening said sleeve bolt over said stud, a flange on the end of said shank having a diameter not more than the diameter of said portion of a smaller diameter, a recessed portion adjacent said flange, a tapered portion interconnecting said portion of smaller diameter and said recessed portion, and an expandable spring ring adapted to be positioned in said recess and adapted to slide along said shank, said flange preventing axial removal of said spring ring without radial expansion, said spring ring having portions extending outwardly beyond the diameter of said panel hole to abut the undersurface of said understructure upon attempted withdrawal of said sleeve bolt even when said spring ring is positioned in said recessed portion.

5. A quick action fastener for joining a panel to an understructure comprising a stud not having an externally threaded stud, retainer means for mounting said stud in laterally movable non-rotating position behind a hole in said understructure, a sleeve bolt comprising a head and shank, said head having a radial groove therein of a diameter substantially equal to the largest diameter of said shank and of sufficient depth in said head to present the weakest structural portion of said sleeve bolt whereby the outer portion of said head will shear in over torqued fastening, said shank having an indentation therein to present a thin wall portion, said thin wall portion being deformed inwardly to thereby present a frictional engagement with said stud inserted therein, said sleeve bolt shank having an axial internally threaded stud engaging hole the opening of which is unthreaded and of a diameter at least equal to its largest thread diameter, said stud having an unthreaded end portion of diameter no greater than its smallest thread diameter whereby said stud and said shank may become aligned before threaded engagement is made to thereby prevent cross-threading, said shank having a larger outer diameter nearer the head, a smaller outer diameter nearer its end, and a tapered shoulder interconnecting said diameters whereby said shank will cause alignment of misaligned holes as said shank is passed therethrough, said shank having a recessed portion and interconnecting tapered shoulder, said shank having an end flange of a diameter not more than said smaller diameter, an expandable spring ring positioned on said shank and adapted to slide therealong, said end flange preventing axial removal of said spring without radial expansion, said ring having portions thereof extending outwardly beyond the diameter of said panel hole to abut the undersurface of said panel upon attempted withdrawal of said bolt even when said ring is positioned in said recessed portion.

6. A quick action fastener for joining a panel to an understructure comprising a stud nut having an externally threaded stud, retainer means for mounting said stud in laterally movable non-rotating position behind a hole in said understructure, said retaining means including a retainer secured rearwardly of a hole in said understructure, said retainer having a flat annular central portion provided with a bolt opening, said retainer having substantially U-shaped in cross-section ribs radially curved about the center of said bolt opening on a common radius, said ribs thus having inner and outer spaced walls, spaced lug receiving openings in the inner walls, said stud nut having a barrel with outwardly extending lugs thereon, said lugs being engageable with and retained by said lug openings, said central portion being resiliently deformable to provide greater spacing between said openings for releasing said lugs and to permit their withdrawal, said stud being axially and non-rotatably mounted in said barrel, said stud being of smaller diameter than the inner diameter of the walls of said barrel to permit passage of a stud engaging sleeve bolt therebetween, a sleeve bolt comprising a head and shank, said head having a radial groove therein of a diameter substantially equal to the largest diameter of said shank and of sufficient depth in said head to present the weakest structural portion of said sleeve bolt whereby the outer portion of said head will shear in over torqued fastening, said sleeve bolt shank having an axial internally threaded stud engaging hole the opening of which is unthreaded and of a diameter at least equal to its largest thread diameter, said stud having an unthreaded end portion of diameter no greater than its smallest thread diameter whereby said stud and said shank may become aligned before threaded engagement is made to thereby prevent cross-threading, said shank having a larger outer diameter nearer the head, a smaller outer diameter nearer its end, and a tapered shoulder interconnecting said diameters whereby said shank will cause alignment of misaligned holes as said shank is passed therethrough, said shank having a recessed portion and interconnecting tapered shoulder, said shank having an end flange of a diameter not more than said smaller diameter, an expandable spring ring positioned on said shank and adapted to slide therealong, said end flange preventing axial removal of said spring without radial expansion, said ring having portions thereof extending outwardly beyond the diameter of said panel hole to abut the undersurface of said panel upon attempted withdrawal of said bolt even when said ring is positioned in said recessed portion.

7. A quick action fastener for joining a panel to an understructure comprising a stud nut having an externally threaded stud, retainer means for mounting said stud in laterally movable non-rotating position behind a hole in said understructure, said retaining means including a retainer secured rearwardly of a hole in said understructure, said retainer having a flat annular central portion provided with a bolt opening, said retainer having substantially U-shaped in cross-section ribs radially curved about the center of said bolt opening on a common radius, said ribs thus having inner and outer spaced walls, spaced lug receiving openings in the inner walls, said stud nut having a barrel with outwardly extending lugs thereon, said lugs being engageable with and retained by said lug openings, said central portion being resiliently deformable to provide greater spacing between said openings for releasing said lugs and to permit their withdrawal, said stud being axially and non-rotatably mounted in said barrel, said stud being of smaller diameter than the inner diameter of the walls of said barrel to permit passage of a stud engaging sleeve bolt therebetween, a sleeve bolt comprising a head and shank, said head having a radial groove therein of a diameter substantially equal to the largest diameter of said shank and of sufficient depth in said head to present the weakest structural portion of said sleeve bolt whereby the outer portion of said head will shear in over torqued fastening, said shank having an indentation therein to present a thin wall portion, said thin wall portion being deformed inwardly to thereby present a frictional engagement with said stud inserted therein, said shank having a larger outer diameter nearer the head, a smaller outer diameter nearer its end, and a tapered shoulder interconnecting said diameters whereby said shank will cause alignment of misaligned holes as said shank is passed therethrough, said shank having a recessed portion and interconnecting tapered shoulder, said shank having an end flange of a diameter not more than said smaller diameter, an expandable spring ring positioned on said shank and adapted to slide therealong, said end flange preventing axial removal of said spring without radial expansion, said ring having portions thereof extending outwardly beyond the diameter of said panel hole to abut the undersurface of said panel upon attempted withdrawal of said bolt even when said ring is positioned in said recessed portion.

8. A quick action fastener for joining a panel to an understructure comprising a stud nut having an externally threaded stud, retainer means for mounting said stud in laterally movable non-rotating position behind a hole in said understructure, said retaining means including a retainer secured rearwardly of a hole in said understructure, said retainer having a flat annular central portion provided with a bolt opening, said retainer having substantially U-shaped in cross-section ribs radially curved about the center of said bolt opening on a common radius, said ribs thus having inner and outer spaced walls, spaced lug receiving openings in the inner walls, said stud nut having a barrel with outwardly extending lugs thereon, said lugs being engageable with and retained by said lug openings, said central portion being resiliently deformable to provide greater spacing between said openings for releasing said lugs and to permit their withdrawal, said stud being axially and non-rotatably mounted in said barrel, said stud being of smaller diameter than the inner diameter of the walls of said barrel to permit passage of a stud engaging sleeve bolt therebetween, a sleeve bolt comprising a head and shank, said head having a radial groove therein of a diameter substantially equal to the largest diameter of said shank and of sufficient depth in said head to present the weakest structural portion of said sleeve bolt whereby the outer portion of said head will shear in over torqued fastening, said shank having an indentation therein to present a thin wall portion, said thin wall portion being deformed inwardly to thereby present a frictional engagement with said stud inserted therein, said sleeve bolt shank having an axial internally threaded stud engaging hole the opening of which is unthreaded and of a diameter at least equal to its largest thread diameter, said stud having an unthreaded end portion of diameter no greater than its smallest thread diameter whereby said stud and said shank may become aligned before threaded engagement is made to thereby prevent cross-threading, said shank having a larger outer diameter nearer the head, a smaller outer diameter nearer its end, and a tapered shoulder interconnecting said diameters whereby said shank will cause alignment of misaligned holes as said shank is passed therethrough, said shank having a recessed portion and interconnecting tapered shoulder, said shank having an end flange of a diameter not more than said smaller diameter, an expandable spring ring positioned on said shank and adapted to slide therealong, said end flange preventing axial removal of said spring without radial expansion, said ring having portions thereof extending outwardly beyond the diameter of said panel hole to abut the undersurface of said panel upon attempted withdrawal of said bolt even when said ring is positioned in said recessed portion.

9. A quick action fastener for joining a panel to an understructure comprising a stud not having an externally threaded stud, retainer means for mounting said stud in laterally movable non-rotating position behind a hole in said understructure, said retaining means including a retainer secured rearwardly of a hole in said understructure, said retainer having a flat annular central portion provided with a bolt opening, said retainer having substantially U-shaped in cross-section ribs radially curved about the center of said bolt opening on a common radius, said ribs thus having inner and outer spaced walls, spaced lug receiving openings in the inner walls, said stud nut having a barrel with outwardly extending lugs thereon, said lugs being engageable with and retained by said lug openings, said central portion being resiliently deformable to provide greater spacing between said openings for releasing said lugs and to permit their withdrawal, said stud being axially and non-rotatably mounted in said barrel, said stud being of smaller diameter than the inner diameter of the walls of said barrel to permit passage of a stud engaging sleeve bolt therebetween, a sleeve bolt comprising a head and shank, said head having a radial groove therein of a diameter substantially equal to the largest diameter of said shank and of sufficient depth in said head to present the weakest structural portion of said sleeve bolt whereby the outer portion of said head will shear in over torqued fastening, said shank having an indentation therein to present a thin wall portion, said thin wall portion being deformed inwardly to thereby present a frictional engagement with said stud inserted therein, said sleeve bolt shank having an axial internally threaded stud engaging hole the opening of which is unthreaded and of a diameter at least equal to its largest thread diameter, said stud having an unthreaded end portion of diameter no greater than its smallest thread diameter whereby said stud and said shank may become aligned before threaded engagement is made to thereby prevent cross-threading, said shank having a larger outer diameter nearer the head, a smaller outer diameter nearer its end, and a tapered shoulder interconnecting said diameters whereby said shank will cause alignment of misaligned holes as said shank is passed therethrough, said shank having a recessed portion and interconnecting tapered shoulder, said shank having an end flange of a diameter not more than said smaller diameter, an expandable spring ring positioned on said shank and adapted to slide therealong, said end flange preventing axial removal of said spring without radial expansion, said ring having portions thereof extending outwardly beyond the diameter of said panel hole to abut the undersurface of said panel upon attempted withdrawal of said bolt even when said ring is positioned in said recessed portion.

References Cited in the file of this patent

UNITED STATES PATENTS

| 442,455 | Penrose | Dec. 9, 1890 |
| 447,775 | Higbee | Mar. 10, 1891 |
| 1,587,102 | Wrighton | June 1, 1926 |
| 1,696,523 | Cochran | Dec. 25, 1928 |
| 2,742,072 | Murphy | Apr. 17, 1956 |
| 2,754,871 | Stoll | July 17, 1956 |
| 2,767,950 | Bellon et al. | Oct. 23, 1956 |
| 2,815,789 | Hutson et al. | Dec. 10, 1957 |

FOREIGN PATENTS

| 298,044 | Great Britain | Oct. 4, 1928 |